(12) United States Patent
Berube (10) Patent No.: US 11,247,279 B2
(45) Date of Patent: Feb. 15, 2022

(54) CORNER PROFILING GUIDE

(71) Applicant: Eric Alvin Berube, Ardrossan (CA)

(72) Inventor: Eric Alvin Berube, Ardrossan (CA)

( * ) Notice: Subject to any disclaimer, the term of this patent is extended or adjusted under 35 U.S.C. 154(b) by 246 days.

(21) Appl. No.: 16/293,242

(22) Filed: Mar. 5, 2019

(65) Prior Publication Data

US 2019/0283146 A1 Sep. 19, 2019

Related U.S. Application Data

(60) Provisional application No. 62/639,281, filed on Mar. 6, 2018.

(51) Int. Cl.
| | |
|---|---|
| *B23C 1/12* | (2006.01) |
| *B23B 49/00* | (2006.01) |
| *B23B 47/28* | (2006.01) |
| *B23C 3/12* | (2006.01) |

(52) U.S. Cl.
CPC ............... *B23C 1/12* (2013.01); *B23B 47/28* (2013.01); *B23B 49/00* (2013.01); *B23C 3/126* (2013.01); *B23C 2220/40* (2013.01); *B23C 2260/04* (2013.01)

(58) Field of Classification Search
CPC .... B23C 1/10; B23C 1/12; B23C 3/12; B23C 3/122; B23C 3/124; B23C 3/126; B23C 3/128; B23C 2260/04; Y10T 409/304144; Y10T 409/307672; Y10T 409/30756; Y10T 409/307784; Y10T 409/30784; Y10T 409/307896; B27C 5/10; B23B 49/00; B23B 47/28

See application file for complete search history.

(56) References Cited

U.S. PATENT DOCUMENTS

| | | | | |
|---|---|---|---|---|
| 2,445,039 A | * | 7/1948 | Rusnok | B23Q 1/5406 248/278.1 |
| 2,499,842 A | * | 3/1950 | Armitage | B23C 1/12 409/199 |
| 2,630,151 A | * | 3/1953 | Turnbull | B23Q 9/0014 144/136.1 |
| 2,849,900 A | * | 9/1958 | Heidtman, Jr. | B25H 1/0078 408/112 |
| 2,911,764 A | * | 11/1959 | Steggeman | B24B 25/00 451/254 |
| 2,948,168 A | * | 8/1960 | Mccormick | B23Q 1/50 408/69 |
| 3,212,541 A | * | 10/1965 | Burrows | B27C 5/10 144/134.1 |

(Continued)

FOREIGN PATENT DOCUMENTS

DE 10046814 A1 * 4/2002 ............ B23D 51/02

*Primary Examiner* — Nicole N Ramos
(74) *Attorney, Agent, or Firm* — Bennett Jones LLP (57) ABSTRACT

An apparatus for guiding a rotary tool along a work piece corner edge formed by the intersection of two orthogonal planar surfaces, has a corner guide formed by two orthogonal planar components and defining a longitudinal axis from back to front. An adjustable tool holder assembly is affixed to the corner guide, includes a tool holder, and is configured to independently adjust a tool holder longitudinal position along the corner guide, a radial position of the tool holder relative to the corner guide, and an angular orientation of the tool holder rotating in a transverse plane orthogonal to the longitudinal axis.

12 Claims, 10 Drawing Sheets

(56) References Cited

U.S. PATENT DOCUMENTS

| | | | | |
|---|---|---|---|---|
| 3,241,453 | A * | 3/1966 | Baldwin | B27D 5/006 409/180 |
| 3,413,893 | A * | 12/1968 | Wilson | B23Q 1/5412 409/217 |
| 3,628,579 | A * | 12/1971 | Roche | B23Q 9/0028 144/135 |
| 3,843,276 | A * | 10/1974 | Williams | B23B 39/14 408/236 |
| 3,893,372 | A * | 7/1975 | Strakeljahn | B23Q 9/0028 409/180 |
| 3,910,159 | A * | 10/1975 | Gladwin | B24B 17/02 409/199 |
| 4,273,483 | A * | 6/1981 | Mendicino | B27C 5/10 144/136.1 |
| 4,290,464 | A * | 9/1981 | Marsan | B23Q 9/0028 144/136.95 |
| 4,572,715 | A * | 2/1986 | Wolff | B23B 47/287 144/154.5 |
| 4,589,174 | A * | 5/1986 | Allen | B23Q 1/48 29/33 R |
| 4,608,291 | A * | 8/1986 | Gove | B23Q 9/0028 144/154.5 |
| 4,655,653 | A * | 4/1987 | Hall | B23Q 9/0028 409/182 |
| 4,865,496 | A * | 9/1989 | Challis | B23B 47/28 408/115 R |
| 4,977,938 | A * | 12/1990 | Greeson | B23Q 9/0035 144/136.95 |
| 4,978,257 | A * | 12/1990 | Nowman | B23B 47/287 408/111 |
| 4,993,897 | A * | 2/1991 | Anderhalden | B23Q 9/0028 144/136.95 |
| 5,238,340 | A * | 8/1993 | Ochiai | B23Q 11/0028 409/201 |
| 5,423,642 | A * | 6/1995 | Heck | B23C 3/12 144/136.8 |
| 5,664,308 | A * | 9/1997 | Deitert | B23Q 39/02 29/40 |
| 5,697,415 | A * | 12/1997 | Kozyrski | B27F 5/02 144/371 |
| 5,772,368 | A * | 6/1998 | Posh | B23Q 9/0085 144/136.95 |
| 5,961,156 | A * | 10/1999 | Furuhashi | B23Q 1/0009 285/154.1 |
| 6,539,992 | B1 * | 4/2003 | Nuss | B25H 1/0021 144/135.2 |
| 8,256,320 | B2 * | 9/2012 | Mignano | B66C 17/04 74/490.03 |
| 8,899,890 | B2 * | 12/2014 | Park | B23Q 1/5425 409/201 |
| 2001/0021338 | A1 * | 9/2001 | Mitsuzono | B23Q 1/623 409/201 |
| 2002/0168241 | A1 * | 11/2002 | David | B27C 5/10 409/178 |
| 2004/0250880 | A1 * | 12/2004 | Dement | B27F 5/12 144/82 |
| 2007/0059116 | A1 * | 3/2007 | Brunemann | B23C 1/12 409/201 |
| 2008/0078075 | A1 * | 4/2008 | Schrott | B23C 9/005 409/201 |
| 2011/0014001 | A1 * | 1/2011 | Takahashi | B23Q 15/007 409/131 |

* cited by examiner

CORNER PROFILING GUIDE

FIELD OF THE INVENTION

The present invention relates to a guide that facilitates use of a rotary tool for milling a variety of profiles at the corner edge of a work piece, and/or for drilling holes in the work piece at desired angles.

BACKGROUND OF THE INVENTION

Handheld routers with an attached tool bit may be used to mill profiles at a corner edge of a work piece. However, a user must have access to several bits to mill different profiles since each tool bit is adapted to mill only one specific profile (e.g., a chamfer, trimmed edge, rabbet, or rounded corner). Moreover, a router typically has a base plate that surrounds the shaft that holds the tool bit. As the user moves the router along the edge of the work piece, the annular base plate may contact another part of the work piece and thereby prevent the tool bit from being able to mill the entire edge.

Hand-held powered rotary tools such as marketed under the tradename Dremel™ (Robert Bosch Tool Corporation (RBTC), Mt. Prospect, Ill., USA) can also be used to mill profiles at a corner edge of a work piece by attachment of an appropriate tool bit, and an accessory so that the resulting system resembles a conventional router with an annular base plate. However, the resulting system has the deficiencies that are associated with the conventional router.

Accordingly, there is a need in the art for a guide that can enable use of a hand-held rotary power tool to mill a variety of profiles at the corner edge of a work piece.

SUMMARY OF THE INVENTION

In one aspect, the present invention comprises an apparatus for guiding a rotary tool comprising a rotatable tool bit relative to a corner edge of a work piece formed by an intersection of two orthogonal planar surfaces. The apparatus comprises a corner guide which is formed from two orthogonal planar guide surfaces, which are adapted to conform to the work piece corner edge to position the apparatus relative to the work piece. The corner guide defines a longitudinal axis and a transverse plane orthogonal to the longitudinal axis. The apparatus also includes a tool holder assembly affixed to the corner guide. The tool holder assembly includes a tool holder. The tool holder assembly is configured to independently adjust: (i) a tool holder position longitudinally along the corner guide, (ii) a radial position of the tool holder in the transverse plane, relative to the corner guide; and (iii) an angular orientation of the tool holder rotating in the transverse plane.

In one embodiment, the corner guide defines a forward V-shaped notch.

In one embodiment, the adjustable tool holder assembly comprises a mounting bracket mounted to the corner guide, and moveable along the longitudinal axis. The adjustable tool holder assembly may comprise an arcuate track mounted to the mounting bracket and moveable in a radial direction relative to the mounting bracket. The adjustable tool holder assembly may comprise a traveling member mounted to the arcuate track and moveable along the arcuate track in a circular arc to change the angular orientation of the tool holder. The tool holder may be slidably mounted to the traveling member but in fixed radial orientation.

In one embodiment, the corner guide comprises a horizontal guide surface, a vertical guide surface, and a mounting bracket. The tool holder assembly may comprise an arcuate track, a traveling member, a tool mount, and first, second, and third locking mechanisms. The horizontal guide surface is for engaging the horizontal work pieces surface, and the vertical guide surface is for engaging the vertical work piece surface.

The arcuate track is aligned in the transverse plane, and is a circular arc segment, preferably at least about 90°, and defines a geometric center point. The arcuate track is movable within the transverse plane relative to the guide surfaces to adjust the radial position of the arcuate track and thus the relative position of the geometric center point from the corner guide. The first locking mechanism is for fixing the position of the arcuate track relative to the guide surfaces.

The traveling member is movable in a circular direction along the arcuate track to adjust a position of the traveling member along the arcuate track. The second locking mechanism is for fixing the position of the traveling member along the arcuate track.

The tool mount is for securely holding the tool. The tool mount is attached to the traveling member and fixed in orientation relative to the traveling member such that an angular orientation of the tool varies as the traveling member moves along the arcuate track. The tool mount is moveable relative to the traveling member to adjust a radial position of the tool mount relative to the geometric center point of the arcuate track. The third locking mechanism is for fixing the radial position of the tool mount relative to the geometric center point of the arcuate track.

By appropriate selection of the position of the arcuate track, the position of the traveling member along the arcuate track, and the radial position of the tool mount relative to the geometric center point of the arcuate track, the apparatus enables the use of the tool with a single tool bit to perform different milling operations on the corner edge of a work piece. Such milling operations may include edge trimming, and milling chamfers, rabbets, and radius profiles of different configurations. In embodiments, the apparatus allows the tool bit to generate the profile up to an obstruction, such as another portion of the work piece. The apparatus also enables the use of the tool to drill holes in a work piece at desired angles.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF PREFERRED EMBODIMENT

Figure 1:
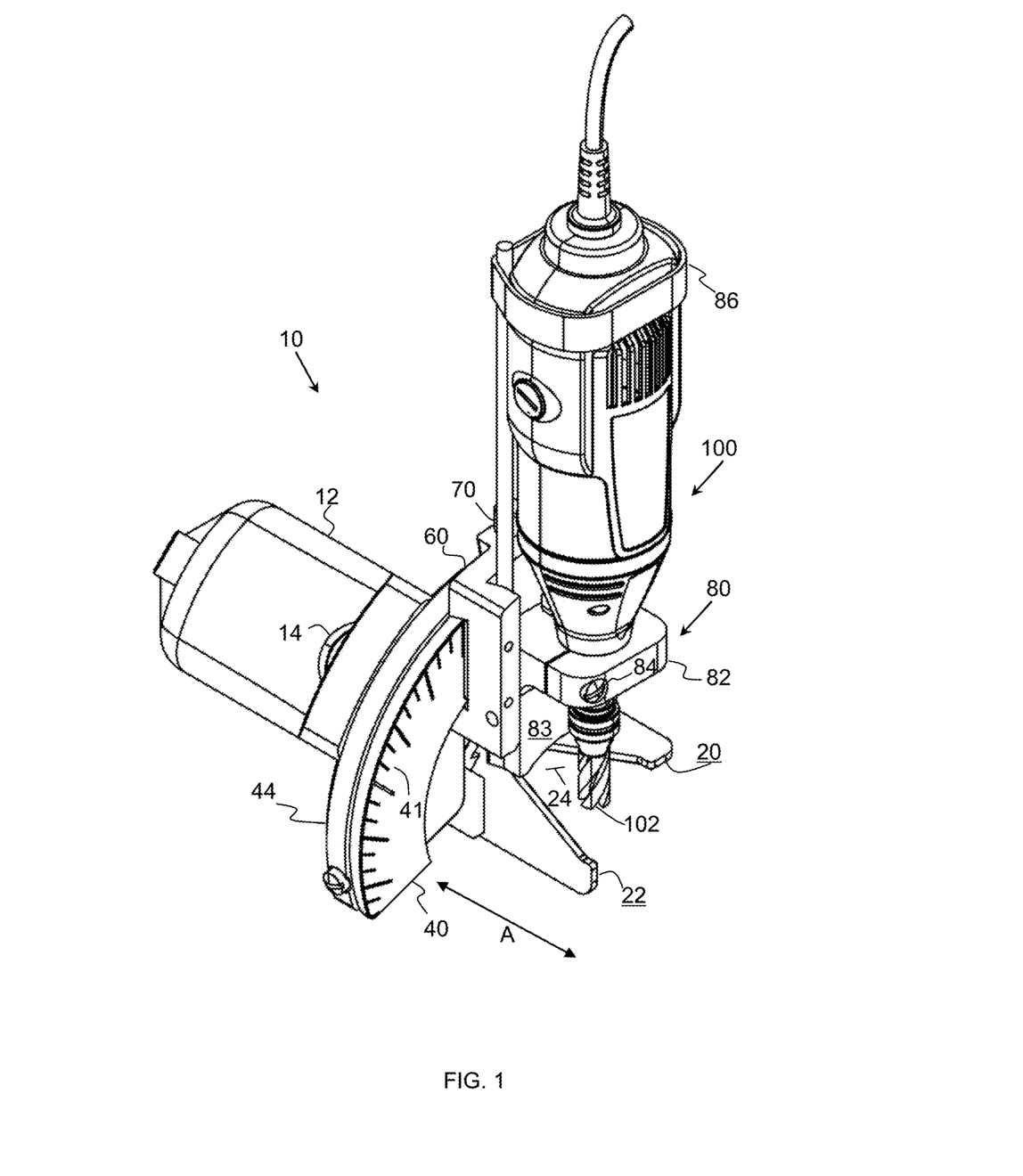
FIG. 1 shows a top right-front perspective view of an embodiment of an apparatus of the present invention, when holding a rotary power tool.

Overview. FIG. 1 shows a top left perspective view of an embodiment of an apparatus (10) of the present invention, when holding a rotary tool (100) that includes a housing that contains a motor that drives rotation of a shaft with an attached tool bit (102). As a non-limiting example, the rotary tool (100) may be a handheld power tool marketed under the tradename Dremel™ (Robert Bosch Tool Corporation (RBTC), Mt. Prospect, Ill., USA). The present invention is not limited by any particular type of the rotary tool (100), which by itself is not part of the present invention.

In the embodiment shown in the Figures, the apparatus (10) comprises a hand grip (12), two orthogonal guide surfaces (20, 22), an arcuate track (40), a first locking mechanism (50), a traveling member (60), a second locking mechanism (70), a tool mount (80), and a third locking mechanism (90). These and other parts of the apparatus (10), and their use and operation are described in greater detail below.

The rotary tool (100) in FIG. 1 is shown in a vertical orientation. As used herein, the terms "horizontal" and "vertical" are used to describe the apparatus at rest in a particular orientation, and not to limit the intended use of the apparatus, which may be used in any orientation allowed by the rotary tool (100), including on inclined surfaces and edges. Also, in this description, the terms "front" and "back" refer to the forward side of the apparatus where the rotary tool (100) is mounted and the back side of the apparatus, which is the far side of the hand grip (12). The longitudinal axis of the apparatus is shown by arrow "A" in FIGS. 1 and 3.

Guide surfaces. The corner guide comprises two orthogonal surfaces: a horizontal guide surface (20) formed by plate (21), and a vertical guide surface (22) formed by plate (23). In one embodiment, the forward end of the corner guide forms a V-shaped notch (24) where the corner edge of a work piece will be accessible. The guide surfaces (20, 22) slide along the work piece, allowing the user to move the apparatus (10) in a controlled tool path along the corner edge of the work piece.

Figure 3:
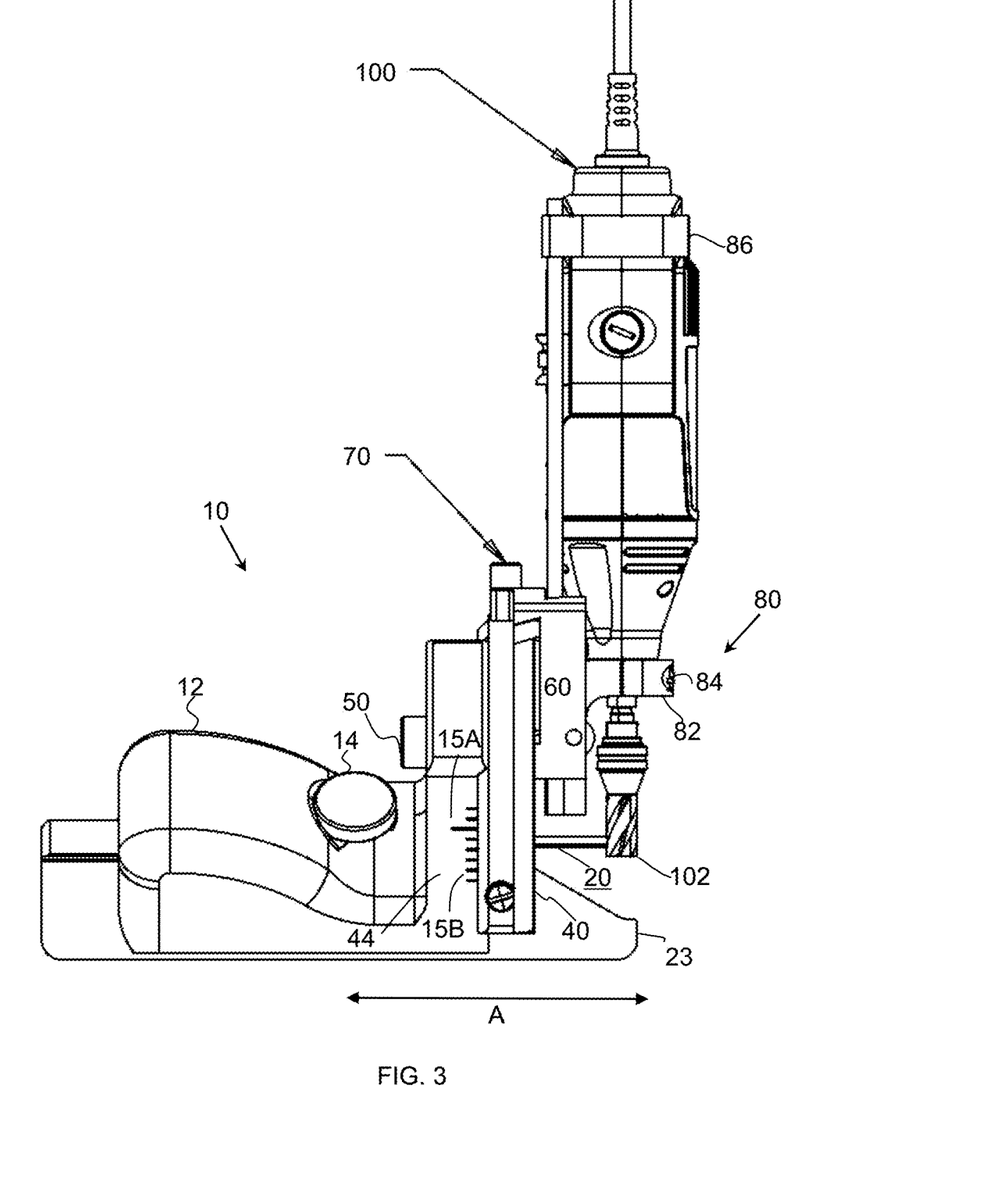
FIG. 3 shows a right side view of the apparatus of FIG. 1.

The hand grip (12) is mounted onto the corner guide and is configured to allow a user to grasp the apparatus (10) and manipulate it to press the guide surfaces (20, 22) into engagement with the work piece surfaces, and push or pull the apparatus (10) with the attached rotary tool (100) along a corner edge of the work piece. In one embodiment of the apparatus (10), as shown in FIG. 3, the hand grip (12) is contoured in the form of a palm grip, but other configurations of the hand grip (12) are possible such as a D-shaped handle, or a pistol-style hand grip. In this embodiment, the hand grip (12) is positioned so that the user's hand is at least partly shielded from the tool bit (102) when placed on the hand grip (12).

In one embodiment, a mounting bracket (44) is moveable relative to the corner guide, in a longitudinal direction, which may move the tool away from and closer to the front end of the corner guide. As may be seen in FIG. 3, the tool cutting bit (102) can be positioned to be aligned with the forward edge of the corner guide. In one embodiment, this adjustment is made possible by a locking screw (14) that passes through the hand grip (12) and engages the corner guide. When the locking screw (14) is loosened, the hand grip and mounting bracket (44) may slide forward or backwards along the corner guide. When the locking screw (14) is tightened to clamp together the hand grip (12) and the plates (21, 23), the locking screw (14) fixes the horizontal position of the plates (21, 23) relative to the hand grip (12) and the remainder of the apparatus (10). In other embodiments, the position of the plates (21, 23) relative to the tool bit (102) may be varied by other mechanisms.

Figure 9:
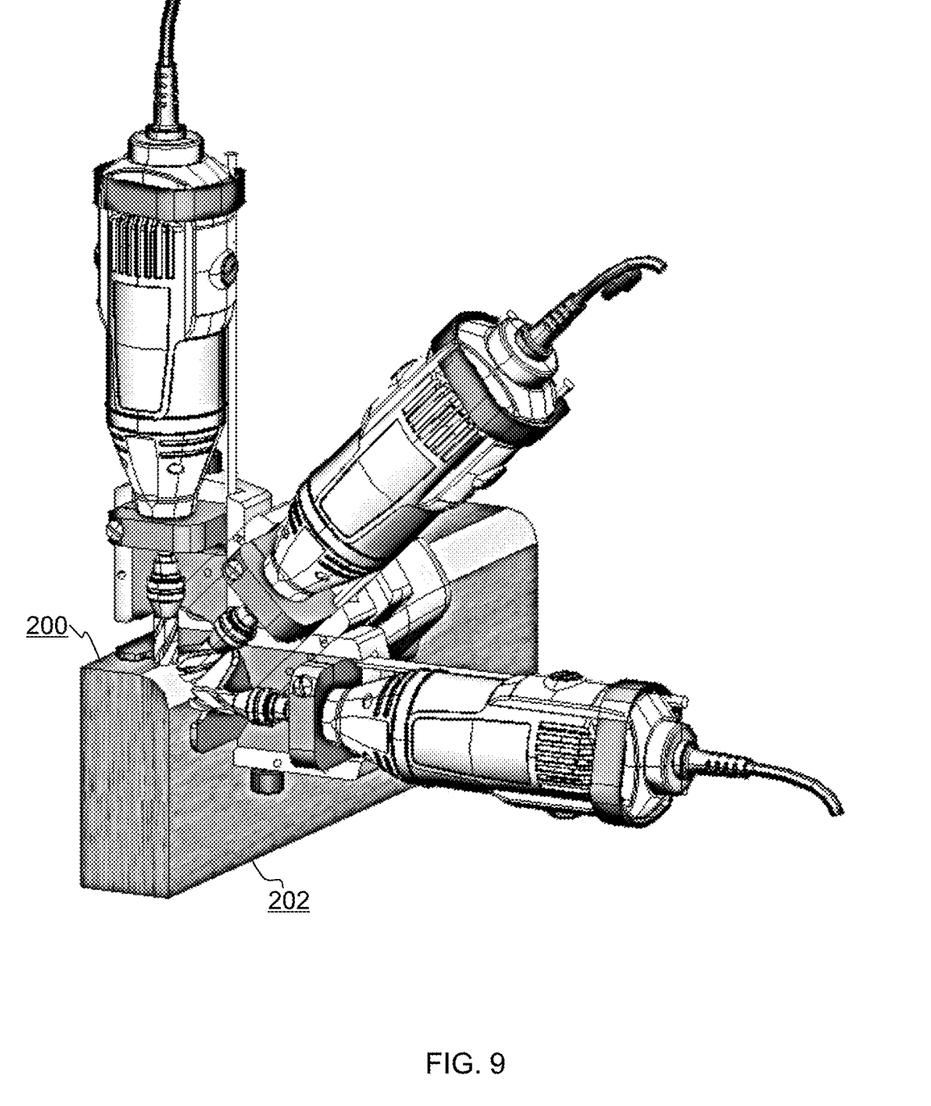
FIG. 9 shows a front left perspective view of the apparatus of FIG. 1, when guiding a rotary power tool to mill a radius profile at the corner edge of a work piece.

It may be desirable to adjust the longitudinal position of the tool bit (102) for various reasons. For example, positioning the tool bit (102) closer to the cusp of the V-shaped void (24) may allow for greater control over the tool (100) by positioning the center of gravity of the tool (100) behind the end of the plates (21, 23). Accordingly, when the tool (100) is run off the end of the work piece, this tool (100) will impart less of an overturning tendency that would tend to cause the apparatus (10) and the tool (100) to abruptly plunge of the end of the work piece. Conversely, it may be desirable to position the tool bit (102) in front of the end of the plates (21, 23) so that the tool bit (102) can be run along the work piece up to an obstruction without interference by the plates (21, 23). As another example, when performing certain milling operations (such as milling of a radius profile as shown in FIG. 9), it may be necessary to position the tool bit (102) in a wider portion of the V-shaped notch (24) so that the tool bit (102) can be placed in certain angular orientations relative to the guide plates (21, 23).

Arcuate track and first locking mechanism. An arcuate track (40) mounts to the mounting bracket (44) and comprises a curved plate that is aligned in the transverse plane, which is orthogonal to the longitudinal direction of arrow "A" shown in FIG. 1. The arcuate track is a circular segment and defines a geometric center point (42), as shown by the intersection point of the cross-hairs in FIG. 2. A "radial direction", as used herein, originates at the center point (42) and extends outward in the transverse plane, in the direction of arrow "B" shown in FIG. 2.

The mounting bracket (44) defines an elongate slot (46) that extends radially outward, at about a 45° angle from the horizontal. A first locking mechanism (50) in the form of a hand-operated locking screw passes through the slot (46) and engages the arcuate track (40). When the locking screw (50) is loosened, the slot (46) allows the arcuate track (40) to be moved radially inward or outward, in the direction of arrow "B". In order to precisely position the arcuate track (40), the user may refer to an indicator line (15A) and scale markings (15B) provided on the mounting bracket (44), as shown in FIG. 3. When the locking screw (50) is tightened to clamp together the arcuate track (40) and the mounting bracket (44), the locking screw (50) fixes the position of the arcuate track (40) relative to the corner guide. In other embodiments, the arcuate track (40) may be independently moveable relative to the guide surfaces (20, 22) in both the horizontal and vertical directions. In other embodiments, the first locking mechanism (50) may be formed by other types of fasteners to prevent movement of the arcuate track (40) relative to the guide surfaces (20, 22).

Figure 2:
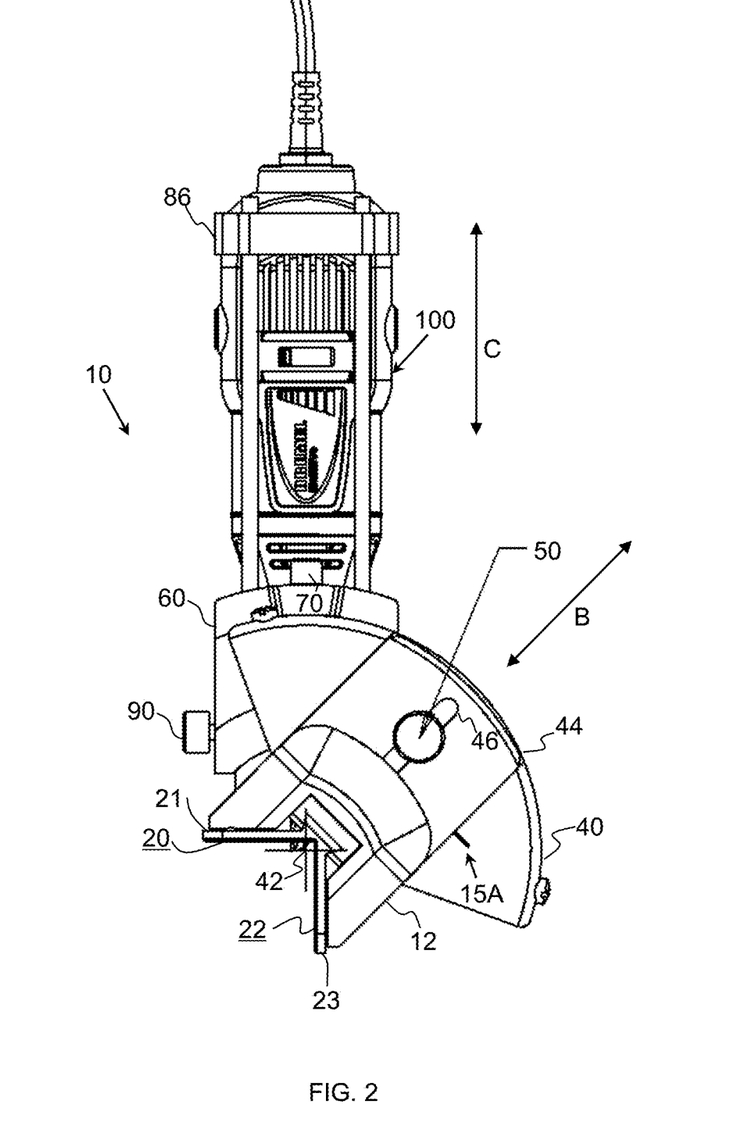
FIG. 2 shows a rear view of the apparatus of FIG. 1.

Traveling member and second locking mechanism. The traveling member (60) is movable circularly along the arcuate track (40) to adjust the angular position of the attached tool mount (80) relative to the corner guide. The tool mount (80) is oriented to position the rotary tool in a desired position. By moving the tool mount (80) along the arcuate track (40), the angular orientation of the rotary tool (100) relative to the corner guide may be adjusted. The traveling member (60) is mounted to the arcuate track (40) such that a center line of the traveling member is always pointed at the arcuate track center point (42). In one embodiment, the arcuate track (40) subtends a central angle of at least 90 degrees so as to allow the angular orientation of the rotary tool (100) to be varied from a fully horizontal orientation to a fully vertical orientation. As shown in FIG. 2, the rotary tool is in a fully vertical position, as the traveling member (60) is positioned at or near one end of the arcuate track (40).

Figure 4:
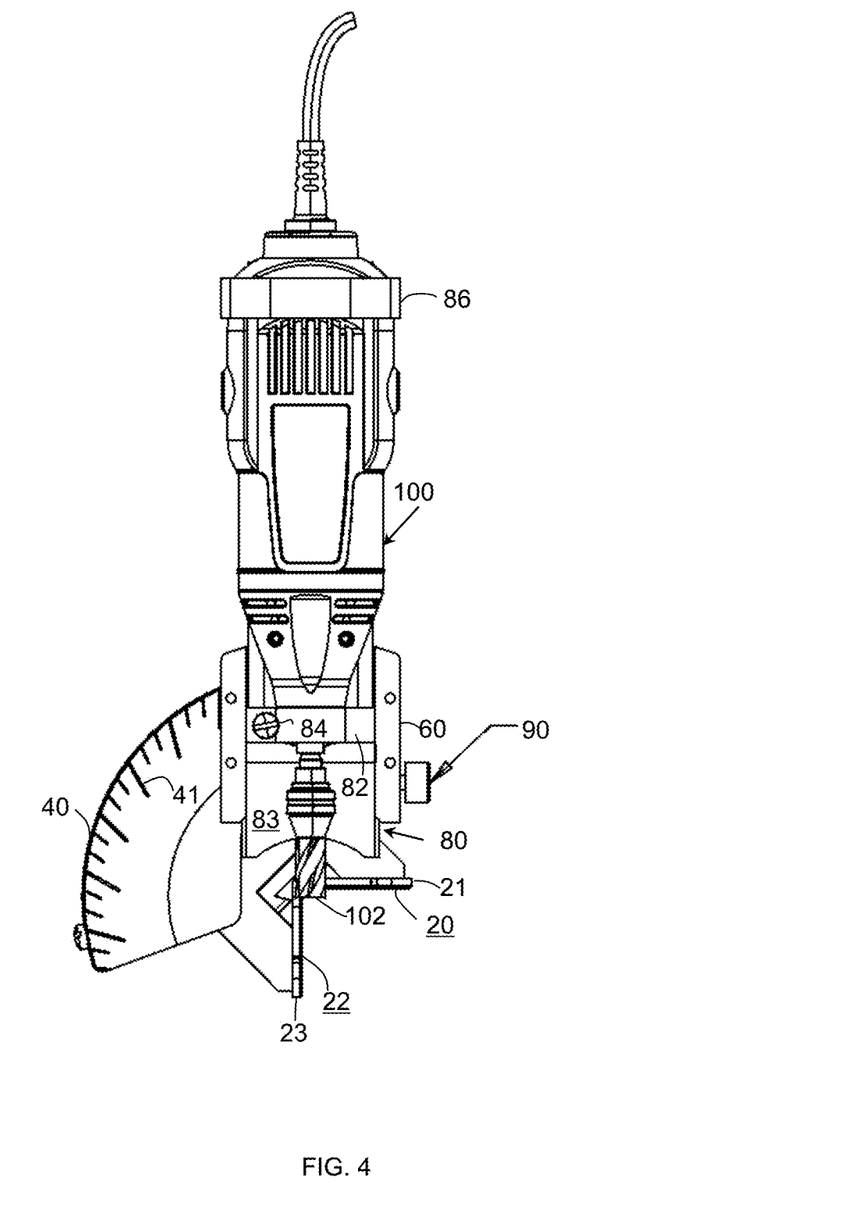
FIG. 4 shows a front view of the apparatus of FIG. 1.
Figure 5:
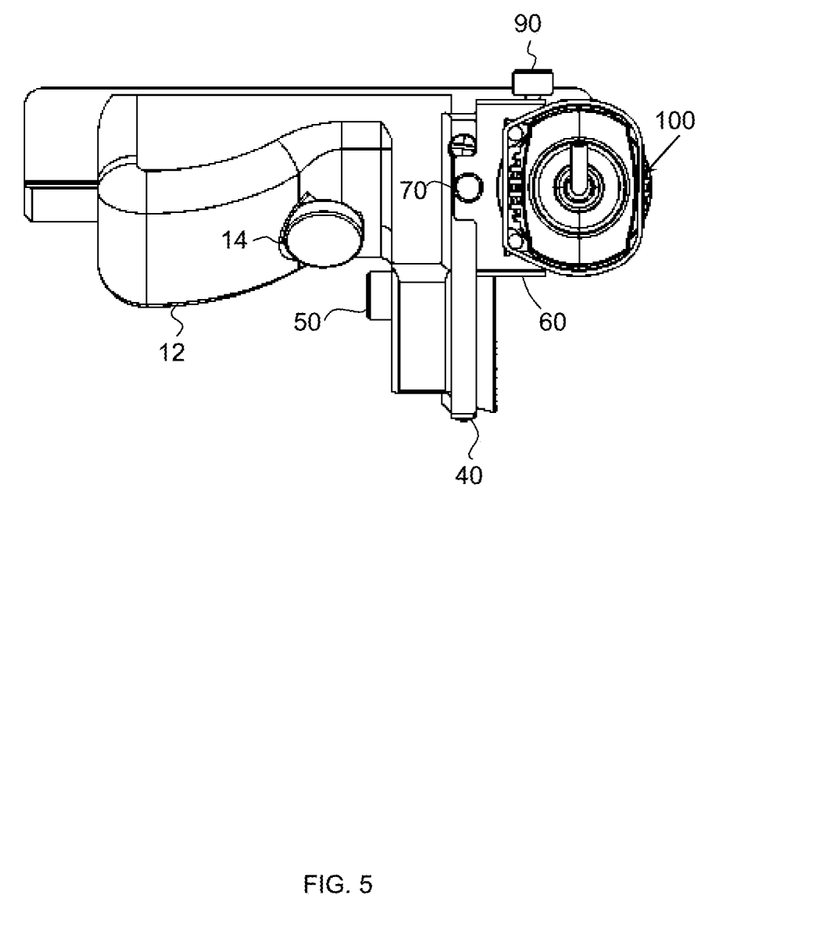
FIG. 5 shows a top view of the apparatus of FIG. 1.

The front surface of the arcuate track (40) may be provided with angular markings (41) (as shown in FIGS. 1 and 4) so that the arcuate track (40) can be used as a protractor to measure the angular orientation of the rotary tool (100) relative to the work piece.

In some embodiments, the traveling member (60) comprises an arc-shaped groove within which the arcuate track (40) is situated, allowing the traveling member to slide along the arcuate track (40). Upper and lower shoulders of the traveling member (60) engage the upper and lower edges, respectively, of the arcuate track (40), while allowing the traveling member (60) to translate along the arcuate track (40). In other embodiments, the traveling member (60) may be formed in other ways. For example, if the arcuate track (40) is formed with a member having an arcuate slot, then the traveling member (60) may have at least one protrusion that slides within the arcuate slot.

In the embodiment of the apparatus (10) shown in the Figures, a second locking mechanism (70) in the form of a hand-operated locking screw passes through an opening formed in the traveling member (60) and engages the arcuate track (40). When the locking screw (70) is loosened, the traveling member (60) is free to translate along the arcuate track (40). When the locking screw (70) is tightened to clamp together the traveling member (60) and the arcuate track (40), the locking screw (70) fixes the position of the traveling member (60) along the arcuate track (40). In other embodiments, the second locking mechanism (70) may be formed by other types of fasteners to prevent movement of the traveling member (60) relative to the arcuate track (40).

Tool mount and third locking mechanism. The tool mount (80) is used to securely hold the rotary tool (100), and is mounted to the traveling member (60). The tool mount (80) may also be referred to as a tool holder.

Rotary tools typically have an elongated housing which serves as a handle and rotating shaft and collet which holds the tool bit. Thus, in some embodiments, the tool mount (80) includes a lower clamp (82) that fits around a lower end of the housing or the shaft of the rotary tool (100), just above the collet that holds the tool bit (102). A screw (84) is provided to tighten the clamp around the lower end of the housing of the rotary tool (100). The tool mount (80) also includes an upper ring (86) that surrounds an upper end of the housing of the rotary tool (100). In other embodiments the tool mount (80) may be formed in other ways, so long as it fixes the position of the rotary tool (100) relative to the traveling member (60).

In one embodiment, the tool mount (80) may slide within the traveling member (60), to adjust the radial position of the tool relative to the geometric center point of the arcuate track (40), in the direction of arrow "C" as shown in FIG. 2. Thus, the tool may be moved away from and closer to the V-shaped notch (24).

In one embodiment, as shown in FIG. 4, the lower clamp (82) extends outwards from a block (83) which slides within the traveling member (60). The upper ring (86) is mounted to two rods which extend upwards from the block (83).

The radial orientation of the tool mount (80) is fixed relative to the traveling member (60). Accordingly, when the traveling member (60) moves along the arcuate track (40), the radial orientation of the tool mount (80) and the rotary tool (100) will move in unison. For example, as shown in FIG. 2, when the traveling member (60) is at the upper end of the arcuate track (40), the rotary tool (100) is in a vertical orientation. When the traveling member (60) is at the lower end of the arcuate track (40), the rotary tool (100) is in a horizontal orientation.

In one embodiment, a third locking mechanism (90) in the form of a hand-operated locking screw passes through an opening formed in the traveling member (60) and engages the lower clamp (84). When the locking screw (90) is loosened, the tool mount (80) is free to move linearly within the traveling member (60). When the locking screw (90) is tightened to clamp together the tool mount (80) and the traveling member (60), the locking screw (90) fixes the radial position of the tool mount (80) relative to the geometric center point of the arcuate track (40).

Figure 10:
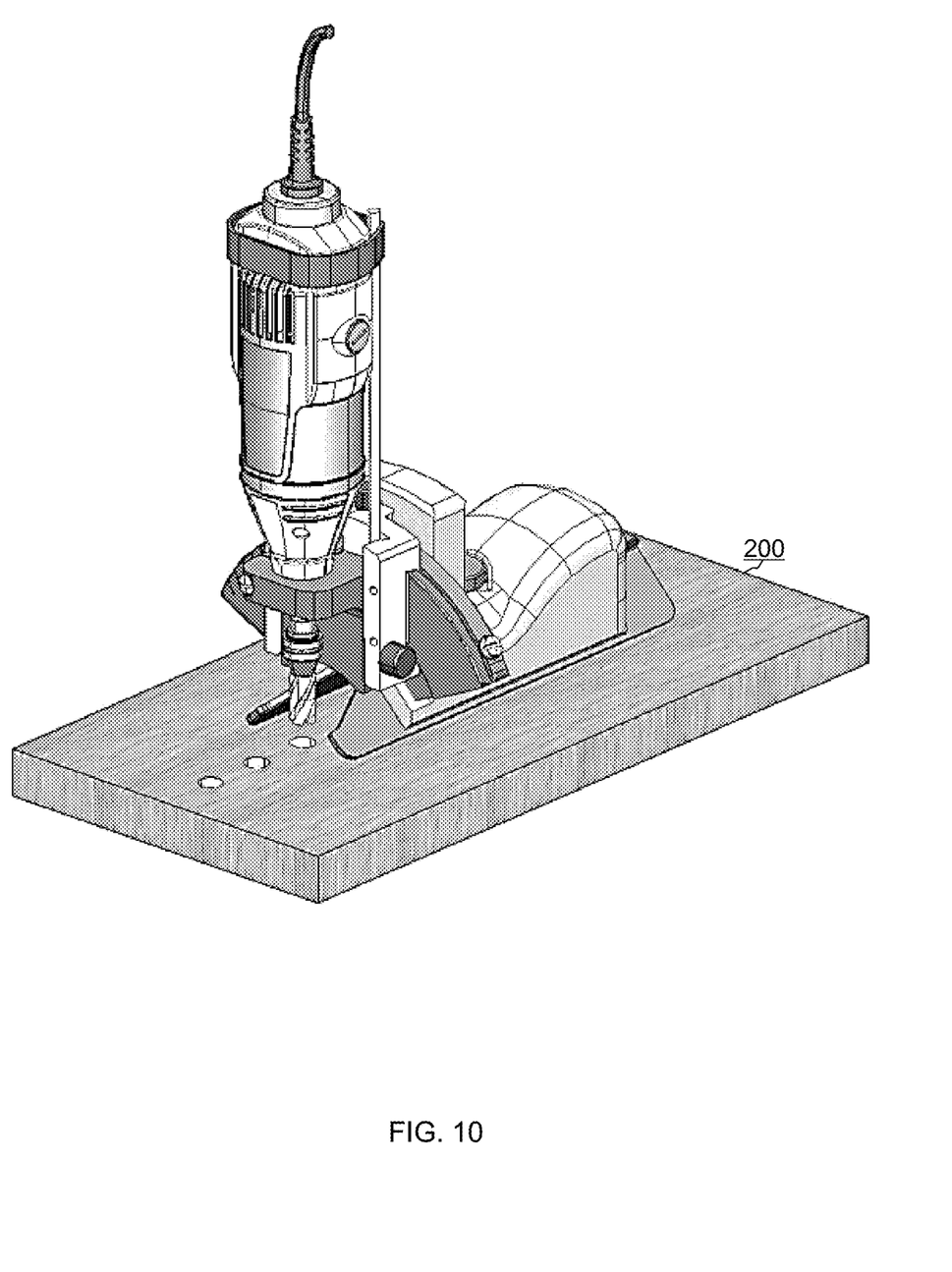
FIG. 10 shows a front left perspective view of the apparatus of FIG. 1, when guiding a rotary power tool to drill holes in a work piece at a desired angle.

Use and operation. FIGS. 6 to 9 show the use of the apparatus (10) to guide the rotary tool (100) to perform a variety of milling operations on the corner edge of a work piece having a horizontal work piece surface (200) and a vertical work piece surface (202). These operations may include, without limitation, edge trimming, and milling chamfers, rabbets, and radius profiles of different configurations as described below. Also, FIG. 10 shows the use of the apparatus (10) to guide the rotary tool (100) to drill holes in a work piece at a desired angle.

Figure 6:
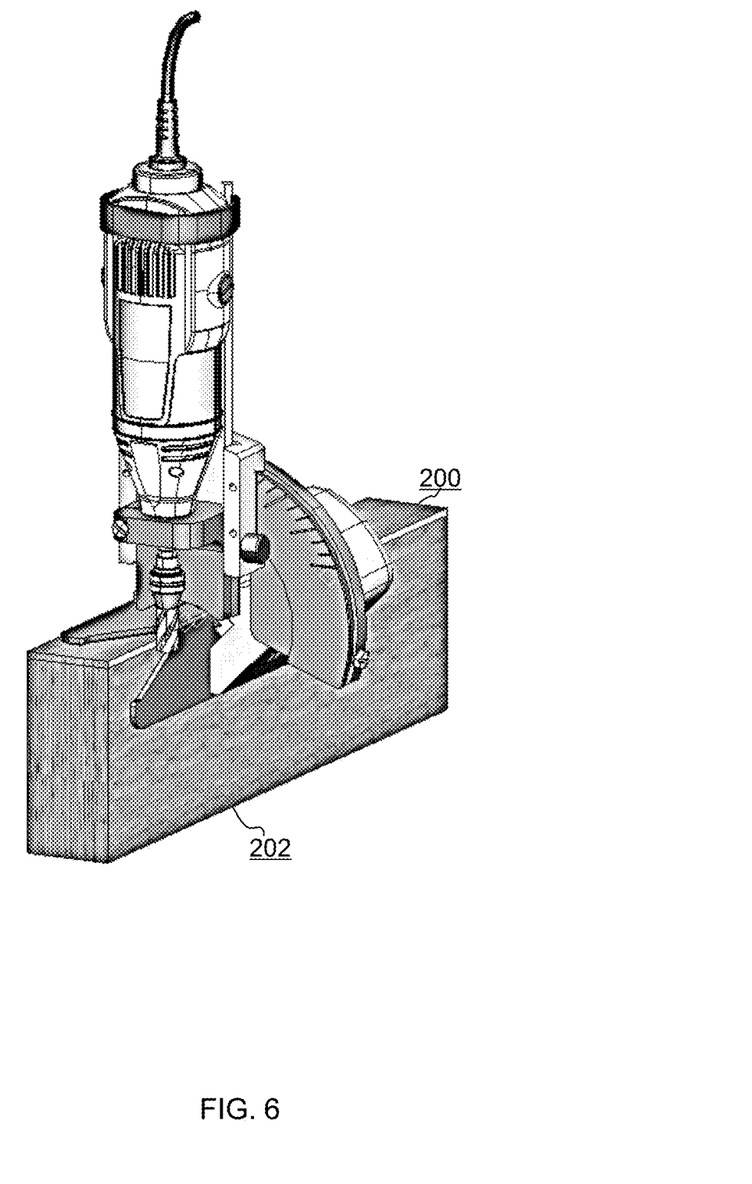
FIG. 6 shows a front left perspective view of the apparatus of FIG. 1, when guiding a rotary power tool to trim the corner edge of a work piece.

Edge trimming. FIG. 6 shows the use of the apparatus (10) of FIG. 1 to guide the rotary tool (100) for edge trimming of corner edge of the work piece. In this example, it is desired to trim the part of the work piece forming the top horizontal surface (200) of the work piece so that its edge is flush with the vertical surface (202) of the work piece. In order to do so, the apparatus (10) is placed with the guide surfaces (20, 22) in engagement with the work piece surfaces. The second locking mechanism (70) is released, and the traveling member (60) is positioned at the upper end of the arcuate track (40) so that the rotary tool (100) is in a vertical orientation. The second locking mechanism (70) is then locked. The first locking mechanism (50) is then released, and the position of the arcuate track (40) relative to the guide plates is adjusted so that the radial surface of the tool bit (102) is tangent to the vertical surface (202) of the work piece. The first locking mechanism (50) is then locked. The third locking mechanism (90) is then released, and the position of the tool mount (80) relative to the traveling member (60) is adjusted so that the tool bit (102) is set at the desired depth. The apparatus (10) is now ready to trim the edge. It should be noted that the edge trimming operation can only be performed by advancing the rotary tool (100) in the forward direction as the uncut edge would interfere with the apparatus (10).

Figures 7A, 7B:
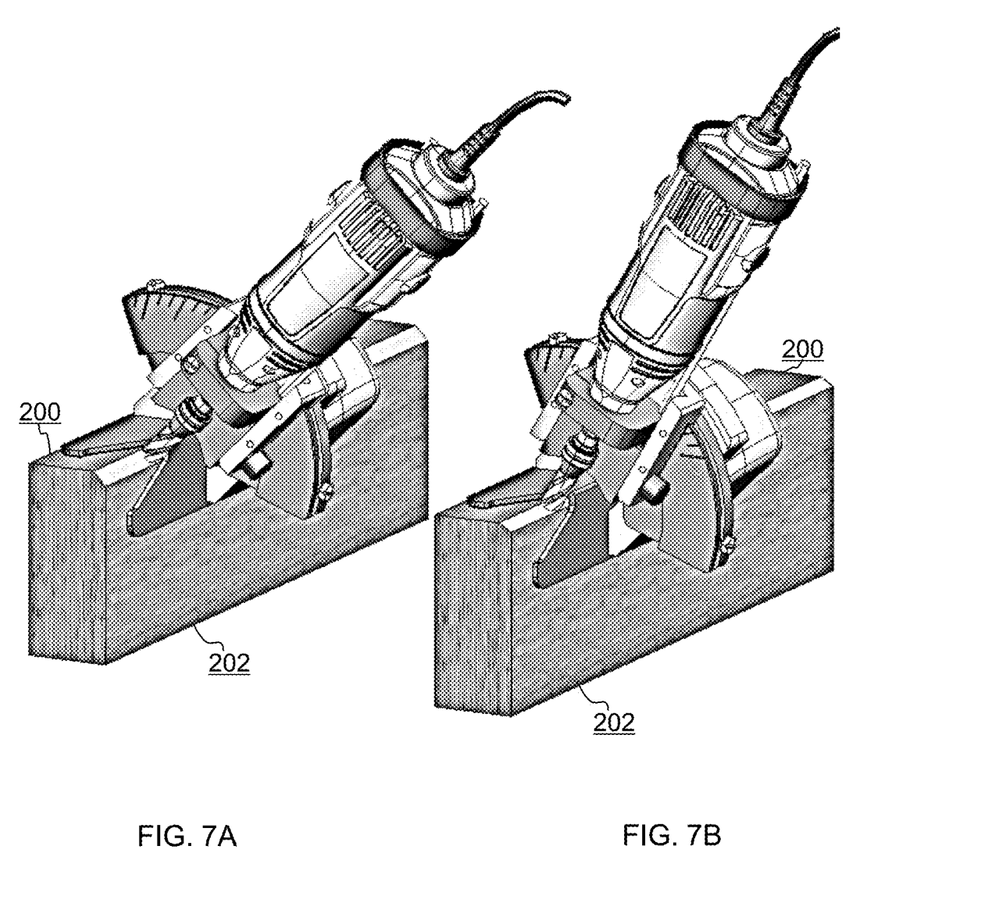
FIG. 7A shows a front left perspective view of the apparatus of FIG. 1, when guiding a rotary power tool to mill a chamfer at the corner edge of a work piece.
FIG. 7B shows a front left perspective view of the apparatus of FIG. 1, when guiding a rotary power tool to mill a chamfer at the corner edge of a work piece, where the chamfer has a different angle than the chamfer shown in FIG. 7A.

Chamfers. FIGS. 7A and 7B show the use of the apparatus (10) to guide the rotary tool (100) to mill chamfers of different angles at the corner edge of the work piece. In order to do so, the apparatus (10) is placed with the guide surfaces (20, 22) in engagement with the work piece surfaces. The second locking mechanism (70) is released, and the traveling member (60) is positioned along the arcuate track (40) so that the angular orientation of the rotary tool (100) is set to achieve the desired chamfer angle. For example, the rotary tool (100) is set to a more vertical orientation in FIG. 7B as compared with FIG. 7A to produce a chamfer having a different incline. The second locking mechanism (70) is then locked. The first and/or third locking mechanism (90) are then released, and the position of the arcuate track (40) relative to the guide plates and/or the position of the tool mount (80) relative to the traveling member (60) is adjusted so that the tool bit (102) is set at the desired chamfer depth. The apparatus (10) is now ready to mill the chamfer.

Figure 8:
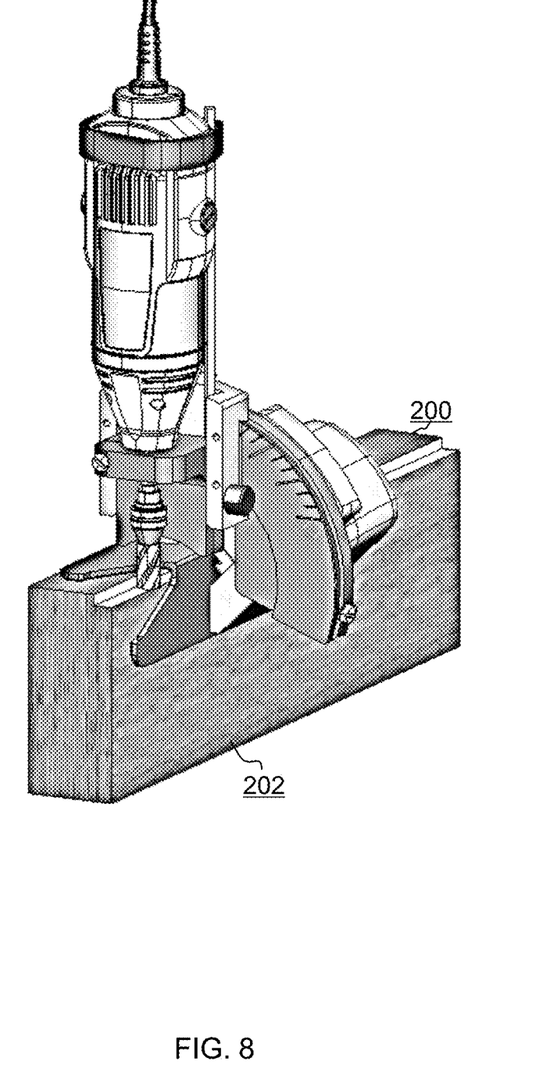
FIG. 8 shows a front left perspective view of the apparatus of FIG. 1, when guiding a rotary power tool to mill a rabbet at the corner edge of a work piece.

Rabbets. FIG. 8 shows the use of the apparatus (10) of FIG. 1 to guide the rotary tool (100) to mill a rabbet at the corner edge of the work piece. In order to do so, the apparatus (10) is placed with the guide surfaces (20, 22) in engagement with the work piece surfaces. The second locking mechanism (70) is released, and the traveling member (60) is positioned at the upper end of the arcuate track (40) so that the rotary tool (100) is in a vertical orientation. The second locking mechanism (70) is then locked. The first locking mechanism (50) is then released, and the position of the arcuate track (40) relative to the guide plates is adjusted so that the center of the arcuate track (40) coincides with the desired inside face of the rabbet as determined by the desired rabbet width. The first locking mechanism (50) is then locked. The third locking mechanism (90) is then released, and the position of the tool mount (80) relative to the traveling member (60) is adjusted so that the tool bit (102) is set at the desired rabbet depth. The apparatus (10) is now ready to mill the rabbet.

Radius profiles. FIG. 9 shows the use of the apparatus (10) of FIG. 1 to guide the rotary tool (100) to mill a radius profile at the corner edge of the work piece. In order to do so, the apparatus (10) is placed with the guide surfaces (20, 22) in engagement with the work piece surfaces. The first locking mechanism (50) is then released, and the position of the arcuate track (40) relative to the guide surfaces (20, 22) is adjusted using scale markings (15B) to produce a desired radius. The first locking mechanism (50) is then locked. The second locking mechanism (70) is released, and the traveling member (60) is positioned at the upper end of the arcuate track (40) so that the rotary tool (100) is in a vertical orientation. The second locking mechanism (70) is then locked. The third locking mechanism (90) is then released, and the position of the tool mount (80) relative to the traveling member (60) is adjusted so that the tool bit (102) rests on the horizontal surface (200) of the work piece. The apparatus (10) is now ready to guide the tool along the corner edge to perform one milling pass. After performing the milling pass, the second locking mechanism (70) is released, and the traveling member (60) is positioned at another position along the arcuate track (40) to adjust the angular orientation of the rotary tool (100). The second locking mechanism (70) is then locked, and another milling pass is performed. The foregoing process is repeated with each subsequent milling pass being performed with the rotary tool (100) at a different angular orientation. For example, FIG. 9 shows the rotary tool (100) at three different angular orientations (superimposed on each other) for three successive milling passes. It will be appreciated that smaller changes in the angular orientation of the rotary tool (100) between milling passes will result in a smoother radius profile being milled.

Drilling. FIG. 10 shows the use of the apparatus (10) to guide the rotary tool (100) to drill holes in a work piece at a desired angle. In order to do so, the apparatus (10) is placed with the guide plates (21, 23) resting on the surface (200) of the work piece to be drilled. The second locking mechanism (70) is released, and the traveling member (60) is positioned so that the rotary tool (100) is oriented relative to the work piece to create the desired angle of the holes to be drilled. In FIG. 10, for example, the traveling member (60) is set at a position for drilling vertical holes, but it will be appreciated that the traveling member (60) may be set at different positions to orient the rotary tool (100) at different angles relative to the surface (200) of the work piece. The second locking mechanism (70) is then locked. With the first locking mechanism (50) also locked, the third locking mechanism (90) is then released. The holes may then be drilled at the set angle by moving the tool mount (80) downwardly relative to the traveling member (60).

Interpretation. Any term or expression not expressly defined herein shall have its commonly accepted definition understood by a person skilled in the art.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. An apparatus for guiding a rotary tool along a work piece corner edge formed by an intersection of two orthogonal planar surfaces, the apparatus comprising:
    (a) a corner guide comprising two orthogonal planar components, adapted to conform to the work piece corner edge and defining a longitudinal axis from back to front, and a transverse plane orthogonal to the longitudinal axis; and
    (b) an adjustable tool holder assembly affixed to the corner guide, the tool holder assembly comprising a tool holder, the tool holder assembly configured to independently adjust:
        (i) a tool holder longitudinal position along the longitudinal axis, relative to the corner guide;
        (ii) a position of the tool holder in the transverse plane, relative to the corner guide; and
        (iii) an angular orientation of the tool holder rotating in the transverse plane, relative to the corner guide.

2. The apparatus of claim 1 wherein the corner guide defines a forward V-shaped notch that widens from a cusp in a direction parallel to the longitudinal axis.

3. The apparatus of claim 1 wherein the adjustable tool holder assembly comprises a mounting bracket attached to the tool holder, mounted to the corner guide, and moveable relative to the corner guide along the longitudinal axis to adjust the tool holder longitudinal position, relative to the corner guide.

4. The apparatus of claim 3 wherein the adjustable tool holder assembly comprises an arcuate track in the transverse plane, defining a geometric center point, attached to the tool holder, mounted to the mounting bracket and moveable in the transverse plane relative to the mounting bracket to adjust the position of the tool holder and a position of the geometric center point in the transverse plane, relative to the corner guide.

5. The apparatus of claim 4 wherein the adjustable tool holder assembly comprises a traveling member, attached to the tool holder, mounted to the arcuate track and moveable along the arcuate track in a circular arc to change the angular orientation of the tool holder rotating in the transverse plane, relative to the corner guide.

6. The apparatus of claim 5 wherein the tool holder is slidably mounted to the traveling member to adjust a radial position of the tool holder relative to the geometric center point of the arcuate track, wherein the radial position is along a direction that extends from the geometric center point in the transverse plane, but in fixed radial orientation relative to the traveling member.

7. An apparatus for guiding a rotary tool comprising a rotatable tool bit relative to a corner edge of a work piece formed by an intersection of a horizontal work piece surface and a vertical work piece surface, the apparatus comprising:
    (a) a horizontal guide surface for engaging the horizontal work piece surface, and a vertical guide surface for engaging the vertical work piece surface;
    (b) an arcuate track in a vertical plane orthogonal to the guide surfaces, wherein the arcuate track defines a geometric center point, wherein the arcuate track is movable within the vertical plane relative to the guide surfaces to adjust both a vertical position and a horizontal position of the geometric center point relative to the guide surfaces;
    (c) a first locking mechanism for fixing the horizontal position and the vertical position of the geometric center point of the arcuate track relative to the guide surfaces;
    (d) a traveling member movable along the arcuate track to adjust a position of the traveling member along the arcuate track;
    (e) a second locking mechanism for fixing the position of the traveling member along the arcuate track;
    (f) a tool mount for securely holding the tool, wherein the tool mount is attached to the traveling member and fixed in orientation relative to the traveling member such that an angular orientation of the tool varies as the traveling member moves along the arcuate track, and wherein the tool mount is moveable relative to the traveling member to adjust a radial position of the tool mount relative to the geometric center point of the arcuate track, wherein the radial position is along a direction that extends from the geometric center point in the vertical plane; and
    (g) a third locking mechanism for fixing the radial position of the tool mount relative to the geometric center point of the arcuate track.

8. The apparatus of claim 1 wherein the tool holder assembly is configured to independently adjust the angular orientation of the tool holder rotating in the transverse plane, relative to the corner guide, by at least 90 degrees.

9. The apparatus of claim 5 wherein the traveling member is moveable along the arcuate track in the circular arc to change the angular orientation of the tool holder rotating in the transverse plane, relative to the corner guide, by at least 90 degrees.

10. The apparatus of claim 7 wherein the arcuate track subtends a central angle of at least 90 degrees, such that the angular orientation of the tool varies by at least 90 degrees as the traveling member moves along the arcuate track.

11. The apparatus of claim 7 wherein the arcuate track is moveable horizontally relative to the guide surfaces to adjust a second horizontal position of the arcuate track relative to the guide surfaces, wherein adjustment of the second horizontal position is perpendicular to the vertical plane.

12. The apparatus of claim 7 wherein the horizontal guide surface and the vertical guide surface define a V-shaped notch that widens from a cusp in a horizontal direction that is perpendicular to the vertical plane.

* * * * *